(12) United States Patent
DeSimone et al.

(10) Patent No.: US 9,417,997 B1
(45) Date of Patent: Aug. 16, 2016

(54) AUTOMATED POLICY BASED SCHEDULING AND PLACEMENT OF STORAGE RESOURCES

(71) Applicants: Salvatore DeSimone, Woodbury, CT (US); Edgar J. St. Pierre, Venice, FL (US); Vinodh Ravindran, San Jose, CA (US); Frederick A. Crable, Allen, TX (US)

(72) Inventors: Salvatore DeSimone, Woodbury, CT (US); Edgar J. St. Pierre, Venice, FL (US); Vinodh Ravindran, San Jose, CA (US); Frederick A. Crable, Allen, TX (US)

(73) Assignee: EMC Corporation, Hopkinton, MA (US)

( * ) Notice: Subject to any disclaimer, the term of this patent is extended or adjusted under 35 U.S.C. 154(b) by 129 days.

(21) Appl. No.: 13/631,214

(22) Filed: Sep. 28, 2012

(51) Int. Cl.
*G06F 12/02* (2006.01)
*G06F 9/00* (2006.01)
*G06F 3/06* (2006.01)

(52) U.S. Cl.
CPC *G06F 12/02* (2013.01); *G06F 9/00* (2013.01); *G06F 3/06* (2013.01)

(58) Field of Classification Search
CPC ..................................................... G06F 12/02
USPC ........................................................ 711/170
See application file for complete search history.

(56) References Cited

U.S. PATENT DOCUMENTS

| 2005/0216381 | A1* | 9/2005 | Banatwala | G06Q 10/10 705/34 |
| 2009/0063768 | A1* | 3/2009 | Kalos | G06F 3/0607 711/114 |
| 2013/0054889 | A1* | 2/2013 | Vaghani | G06F 3/0604 711/114 |
| 2013/0151683 | A1* | 6/2013 | Jain | G06F 3/0611 709/223 |

\* cited by examiner

*Primary Examiner* — Kevin Verbrugge
*Assistant Examiner* — Zubair Ahmed
(74) *Attorney, Agent, or Firm* — Krishnendu Gupta; Konrad Lee

(57) ABSTRACT

A computer-executable method, system, and computer program product comprising providing a policy based scheduling model comprising modeled instances of objects representing resources, wherein the resources are provisioned within a heterogeneous storage environment, wherein the modeled instances of objects includes a transport zone for mapping a data storage resource within the heterogeneous storage environment to a data storage host, wherein each of the modeled instances of objects includes one or more ports to create I/O paths between the data storage resource and the data storage host, and using the policy based scheduling model to manage the provisioning of the data storage resource in the heterogeneous storage environment.

23 Claims, 9 Drawing Sheets

AUTOMATED POLICY BASED SCHEDULING AND PLACEMENT OF STORAGE RESOURCES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFE-CYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,246 entitled "APPLICATION PROGRAMMING INTERFACE", and Ser. No. 13/631,190 entitled "DISTRIBUTED SYSTEM SOFTWARE INFRASTRUCTURE" filed on even date herewith, the teachings of which applications are hereby incorporated herein by reference in their entirety.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage services balanced against the need for unified and centralized management that can grow or scale proportionally with the growth of what is being managed.

SUMMARY

A computer-executable method, system, and computer program product comprising providing a policy based scheduling model comprising modeled instances of objects representing resources, wherein the resources are provisioned within a heterogeneous storage environment, wherein the modeled instances of objects includes a transport zone for mapping a data storage resource within the heterogeneous storage environment to a data storage host, wherein each of the modeled instances of objects includes one or more ports to create I/O paths between the data storage resource and the data storage host, and using the policy based scheduling model to manage the provisioning of the data storage resource in the heterogeneous storage environment.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
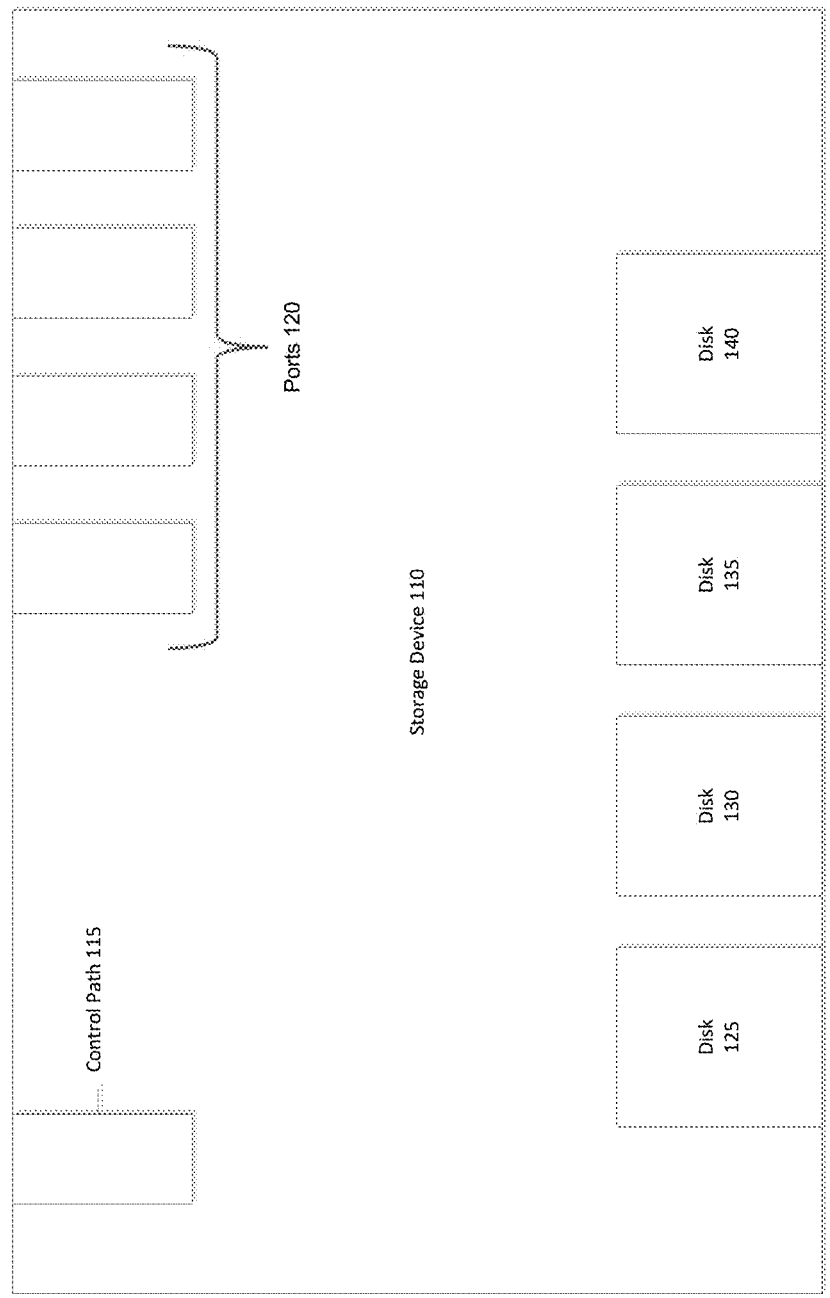
FIG. 1 is a simplified illustration of a data storage device, in accordance with an embodiment of the present disclosure.

Typically, control of and provisioning of multiple data services for heterogeneous storage systems may be problematic. Conventionally, some systems may have only enabled provisioning of homogenous storage systems. Generally, controlling and managing provisioning of heterogeneous storage may not have been possible.

In certain embodiments, the current disclosure may enable a distributed software control platform that allows enterprise IT departments and cloud service providers to convert the heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as one large storage array. In further embodiments, the current disclosure may enable one big array to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data storage software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from a data storage provider to a data storage consumer.

A storage medium may be any medium that is capable of storing data, including, but not limited to a storage array, a storage cluster, a physical disk, a virtual disk, and a virtual storage system.

A data storage pool may be a collection of storage mediums.

A tenant may represent an organization operating within a one big array. In some embodiments, a tenant may be created in the system for the purposes of security isolation.

A neighborhood may represent a fault domain within a network. In many embodiments, a plurality of data centers may be combined to create a federation. In some embodiments, the federation failures may occur that may affect the availability of resources. In certain embodiments, the data centers or federation may account for the failures by segmenting the infrastructure into different fault domains. In some embodiments, each fault domain may be designed to be isolated from other fault domains, while part of the same data center, so that each failure within one fault domain does not affect other fault domains.

A transport zone may represent a region of connectivity within a neighborhood.

A Class of Service may represent high-level capabilities and services that are created by users through composition of resource attributes and quality of services, including level of protection, availability, access protocol, performance, and additional storage/data services, such as versioning/snap, backup, remote replication, data reduction, encryption, etc.

A project may be a resource organization abstraction that maps resources to applications, virtual data centers, departments, or other entities. In some embodiments, a user may create projects and may associate multiple resources from different data services with the projects. In most embodiments, resources from one project may be shared between users under the same tenant.

A Data Mover may be a component enabled to retrieve data from a storage medium or storage device and make it available to a network client.

Generally, a data storage array or system may be one or more physical boxes or a cluster of physical boxes. In conventional systems, the data storage array or system may have one control path and data paths. In typical systems, one or more data path ports may provide data path access to the storage resources contained within the storage system. Typically, the protocols for the data path ports may be fiber channel, Internet Protocol (IP), iSCSI, or NTFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Refer, now to the example embodiment of FIG. 1 which illustrates a sample storage device. Storage device 110 has control path 115, ports 120, and disks 125, 130, 135 and 140. Control path 115 enables a user to interface with storage device 110. Control path 115 enables a user to access disks 125, 130, 135 and 140, via the services storage device 110 offers, through one or more of ports 120.

In an embodiment, the current disclosure may enable data-centric cloud infrastructures to be managed efficiently and flexibly through a data storage software platform. In some embodiments, a data storage software platform may partition the infrastructure into neighborhoods. A neighborhood may include a highly cohesive set of inter-connected heterogeneous data storage pools, network nodes, and computer nodes. In some embodiments, a data storage pool may be associated with one or more neighborhoods.

In many embodiments, a data storage software platform may include a placement scheduler module (scheduler) to automatically place and allocate a storage resource based on a created policy. In certain embodiments, the policy may be defined by attributes, such as: Class of Service, neighborhood, or bandwidth. In some embodiments the scheduling and placement of storage resources may be accomplished by storage pool selection or array port(s) or data mover(s) selection.

In certain embodiments, the scheduler may be used to select a data storage pool based on a created policy. In some embodiments, the policy may specify a neighborhood where the volume may be created (i.e. block volumes, etc.). In many embodiments, the scheduler may query across the data storage pools within a neighborhood to find one or more pools that may match the desired Class of Service capabilities. In certain embodiments, when one or more data storage pools match the selection criteria, the scheduler may select one of the pools using a number of heuristics (i.e. most available capacity, least number of volumes, round-robin, etc.). In other embodiments, the policy may not specify the neighborhood where the volume may be created. In some embodiments, the scheduler may query across all data storage pools available to find a pool that matches the desired Class of Service capabilities.

In some embodiments, the scheduler may enable selection of array ports or data movers to affect operating attributes (i.e. visibility, bandwidth, etc.) of specified data storage resources. In many embodiments, array port or data mover selection may be used for provisioning in an environment using physical Storage Area Networks (SAN) or virtual Storage Area Networks (vSAN). In certain embodiments, an array port or data mover selection may be used to ensure a proper number I/O paths are created to achieve a desired level of availability. In other embodiments, array port or data mover selection may be used to ensure that multiple I/O paths do not share a common fault domain with respect to ports, directors, or SAN switches. In some embodiments, array port or data mover selection may be used to ensure proper balancing of I/O bandwidth across array ports.

In many embodiments, a scheduler may create a model representing resources provisioned within heterogeneous storage resources. In certain embodiments, heterogeneous storage resources may be created in a heterogeneous storage environment containing one or more heterogeneous resources. In some embodiments, the scheduler may model potential implementations of data storage allocation placement or port allocations. In other embodiments, a created policy may include potential implementations of data storage allocation placement or port allocations. In an embodiment, the scheduler may be enabled to call management functions to implement a potential implementation. In some embodiments, a created policy may be used to call management functions to implement a potential implementation. In certain embodiments, the model may enable the scheduler to select ports or data movers. In some embodiments, the model may have a topology of the heterogeneous storage resources. In an embodiment, the topology may have representations of data storage, directors, hosts, associated ports, and transport zones. In certain embodiments, a transport zone may represent a potential region of connectivity within a neighborhood. In some embodiments, transport zones may include vSAN, VLAN, or other IP network constructs for use with iSCSI or file protocols. In many embodiments, the scheduler may use the model to allocate connections between data volumes and the host applications attempting to consume the data volumes. In some embodiments, the data volumes may be allocated from heterogeneous storage resources.

Figure 2:
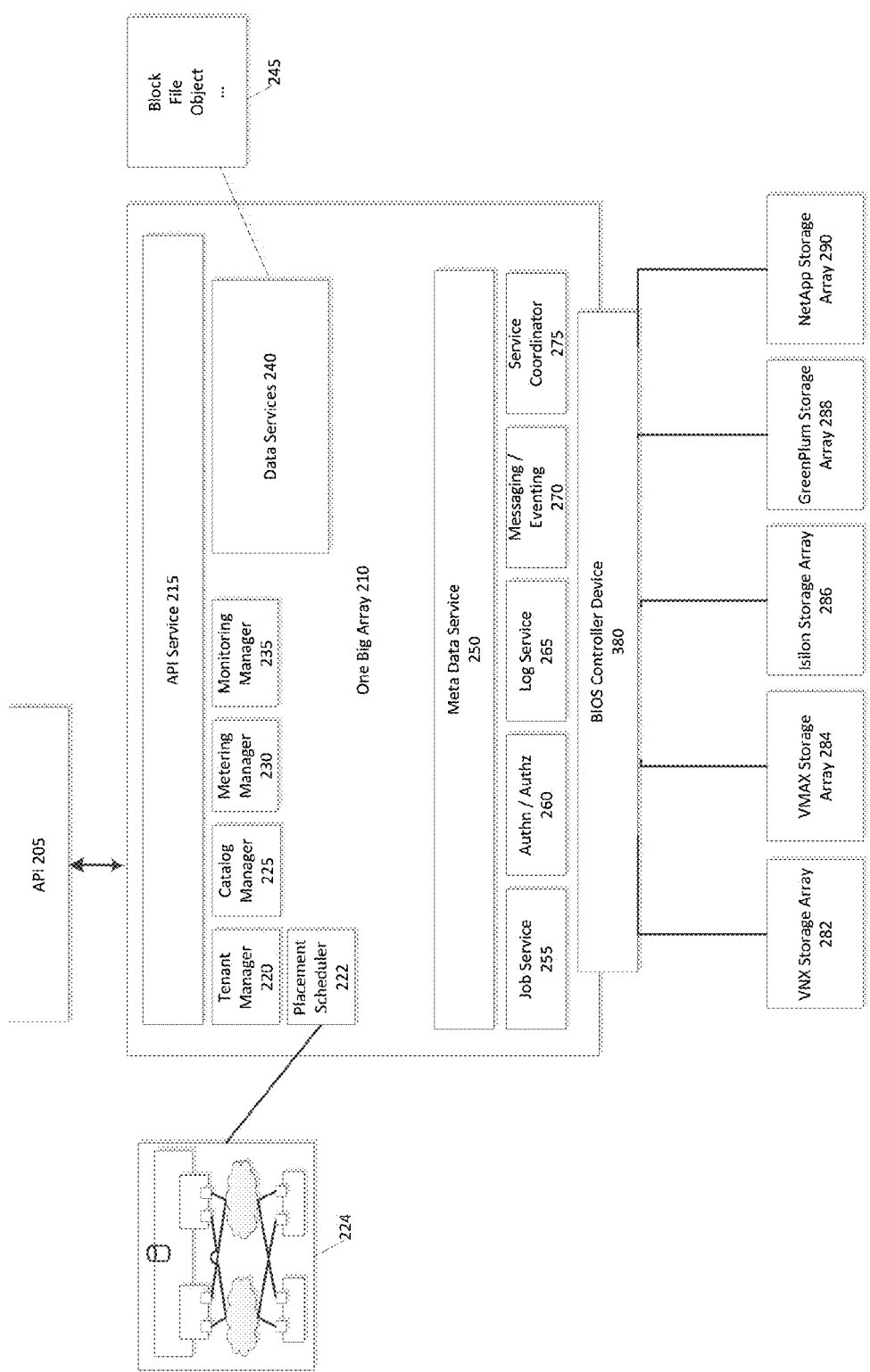
FIG. 2 is a simplified illustration of a one big array, in accordance with an embodiment of the present disclosure.

Refer now to the example embodiment of FIG. 2. FIG. 2 is a simplified illustration of a one big array, in accordance with an embodiment of the present disclosure. As shown in FIG. 2, API Service 215 enables external access to users/administrators through API 205. API Service 215 communicates requests to One Big Array 210. API Service 215 enables access to Service Coordinator 275, which enables access to other services and management modules. Through Service Coordinator 275, API Service 215 has access to tenant manager 220, catalog manager 225, metering manager 230, monitoring manager 235, data services 240, meta data service 250, job service 255, authn/authz 260, log service 265, messaging/eventing 270, scheduler 222, and BIOS Controller Device 280. As shown, Data Services 240, within One Big Array 210, provides block, file, and object data services 245. In many embodiments, scheduler 222 may enable allocation placement and data path access of storage resources based on a created policy. In some embodiments, scheduler 222 may use storage pool selection or array port(s) or data mover(s) selection to determine allocation placement or data path access of storage resources based on a created policy. In the embodiment of FIG. 2 embodiment, a placement or allocation of storage resources may be located within storage arrays 282, 284, 286, 288, 290. As shown in FIG. 2, policy based scheduling model 224 is accessed through placement scheduler 222. Scheduler 222 allocates array port(s) or data mover(s) to facilitate in the placement or allocation of storage resources within storage arrays 282, 284, 286, 288, 290. In certain embodiments, scheduler 222 may select storage pools based on user created policy.

Figure 3:
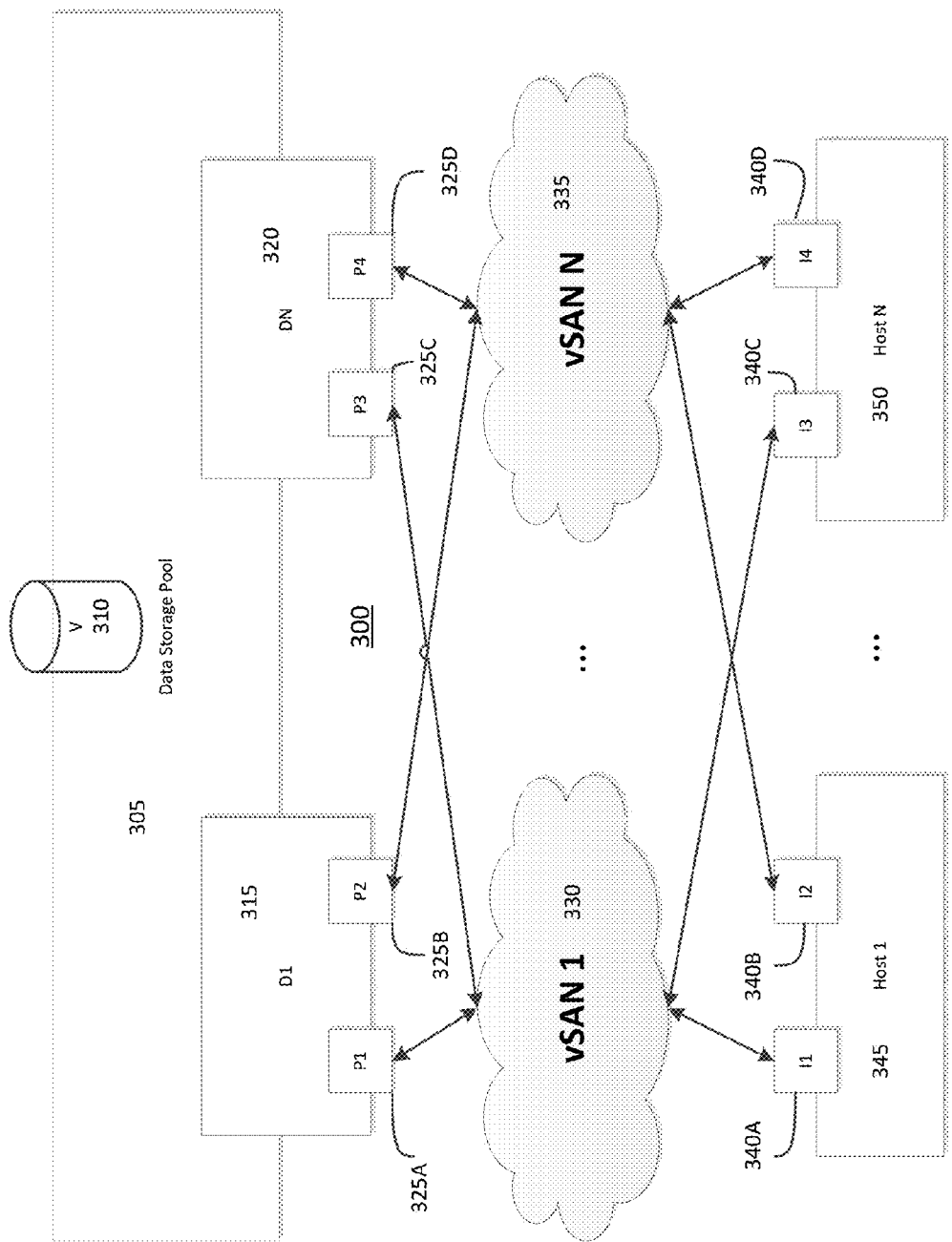
FIG. 3 is a simplified illustration of a policy based scheduling model, in accordance with an embodiment of the present disclosure.

Refer now to example embodiment of FIG. 3. FIG. 3 is a simplified illustrated of policy based scheduling model 300, in accordance with an embodiment of the present disclosure. As shown, a scheduler (i.e. 222, FIG. 2) is using policy based scheduling model 300 to view potential implementations to make data storage volume visible to Host 345 and Host 350. As shown, a scheduler uses policy based scheduling model 300 to create a policy from which a data management software platform may manage the provisioning of a data resource in heterogeneous storage resources. In some embodiments, the heterogeneous storage resources may be located in a heterogeneous storage environment.

When scheduler (i.e. 222, FIG. 2) uses a created policy to issue management commands to data storage on heterogeneous storage resources, the policy based schedule model is implemented on the data storage. As shown, created policy from policy based scheduling model 300 is used to allocate data storage volume 310 to host 345, 350. As shown, data storage volume 310 allocates data storage pool 305. When scheduler issues management commands to data storage on heterogeneous storage resources, scheduler enables data storage pool 305 to be visible externally through directors 315, 320. As shown, directors 315, 320 have ports 325A, 325B, 325C, 325D through which data volume 310 is visible outside of data storage pool 305. Ports 325A, 325B, 325C, 325D are connected to transport zones 330, 335. Host 345, 350 has initiator ports 340A, 340B, 340C, 340D. Hosts 345, 350 connect to transport zones 330, 335 through initiator ports 340A, 340B, 340C, 340D. As shown, data volume 310 is visible to host 345 through transport zone 330 and transport zone 335. For example, initiator port 340A on host 345 is connected to transport zone 330 which is connected to port 325A on director 315. Similarly, data volume 310 is visible to host 350 through transport zone 330 and transport zone 335. In many embodiments, policy based scheduling model 300 may include one or more directors having one or more ports. In some embodiments, policy based scheduling model 300 may include one or more transport zones. In certain embodiments, policy based scheduling model 300 may include one or more hosts having one or more ports. In some embodiments, policy based schedule model 300 may be used to modify a grouping of ports on hosts and/or directors.

Figure 5:
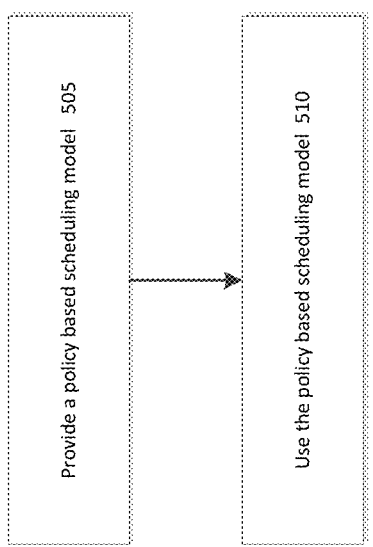

Refer now to the example embodiments of FIGS. 2 and 5. The example embodiments illustrate a simplified flow of how One Big Array 210 manages provisioning of heterogeneous storage resources. As shown in FIG. 2, scheduler 222 is provided a policy based scheduling model 224 enabled for providing modeled instances of objects representing a heterogeneous storage resource (Step 505). Scheduler 222 uses policy based scheduling model 400 to manage the provisioning of the heterogeneous storage resources through creating a scheduling and placement policy (Step 510).

Figure 4:
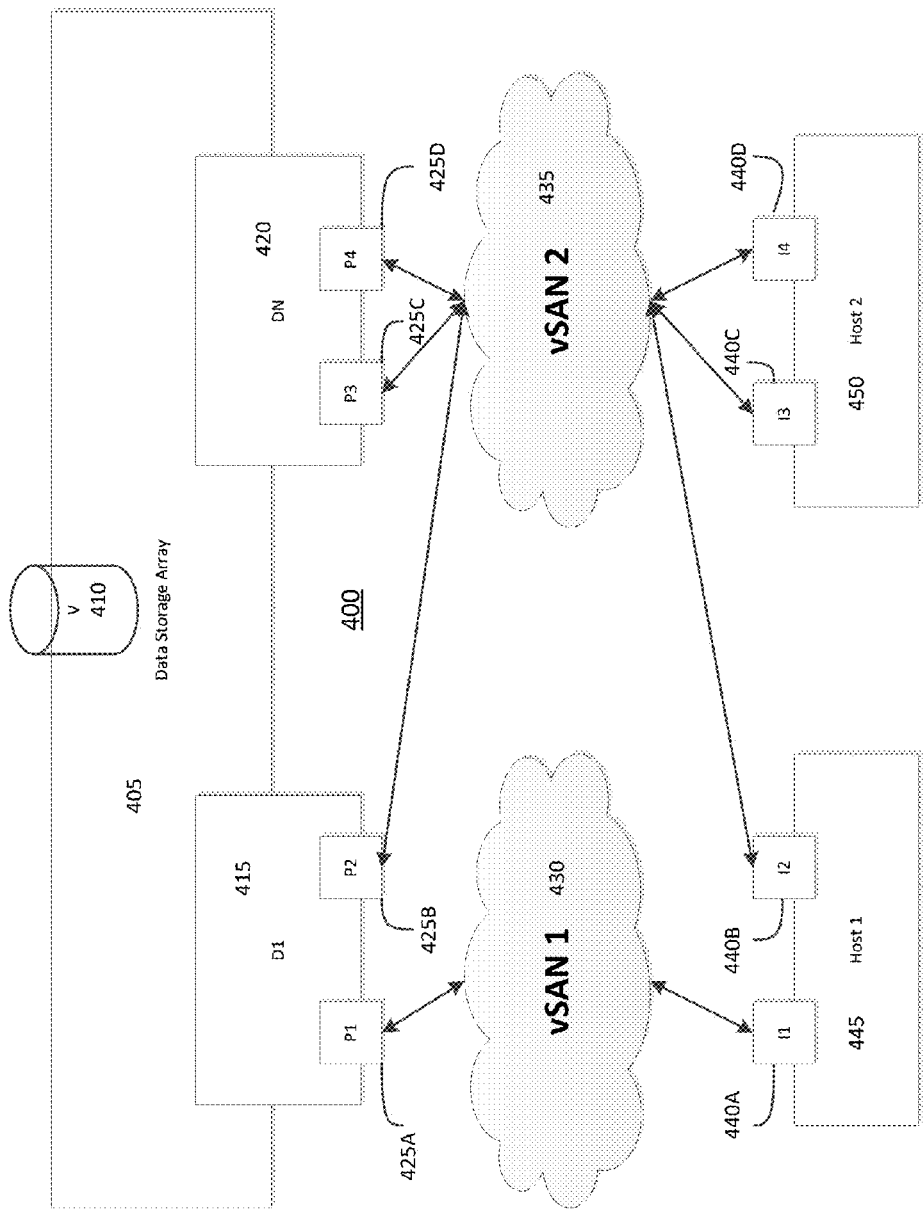
FIG. 4 is an alternative simplified illustration of a policy based scheduling model, in accordance with an embodiment of the present disclosure.
Figure 6:
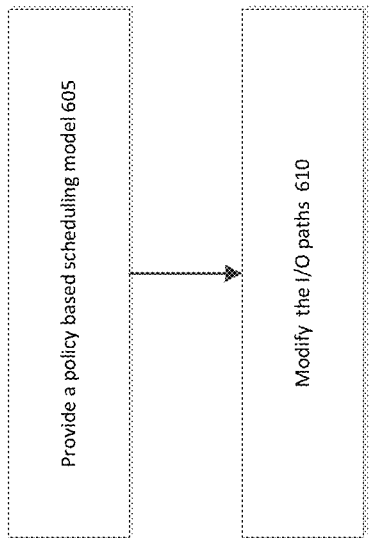
FIGS. 5 and 6 are example embodiments of methods for policy based scheduling on a one big array, in accordance with an embodiment of the present disclosure.

Refer now to example embodiments of FIGS. 4 and 6. The example embodiments illustrate a simplified flow of how a One Big Array manages provisioning of heterogeneous storage resources. As shown in FIG. 4, a policy based scheduling model 400 enabled for providing modeled instances of objects representing heterogeneous storage resources is provided (step 605). Policy based scheduling model 400 modifies ports 425A, 425B, 425C, 425D and/or initiator ports 440A, 440B, 440C, 440D to manage the I/O paths between the data storage volume 410 and the data storage hosts 445, 450 (Step 610). As shown in FIG. 4, port 425A is connected to initiator port 440A through transport zone 430, thereby reserving port 425A for Host 445. In many embodiments, a port mapping may be modified to ensure a proper number I/O paths are created to achieve a desired level of availability. In other embodiments, a port mapping may be modified to ensure that multiple I/O paths do not share a common fault domain with respect to ports, directors, or SAN switches. In some embodiments, a port mapping may be used to ensure proper balancing of I/O bandwidth across array ports.

Figure 7:
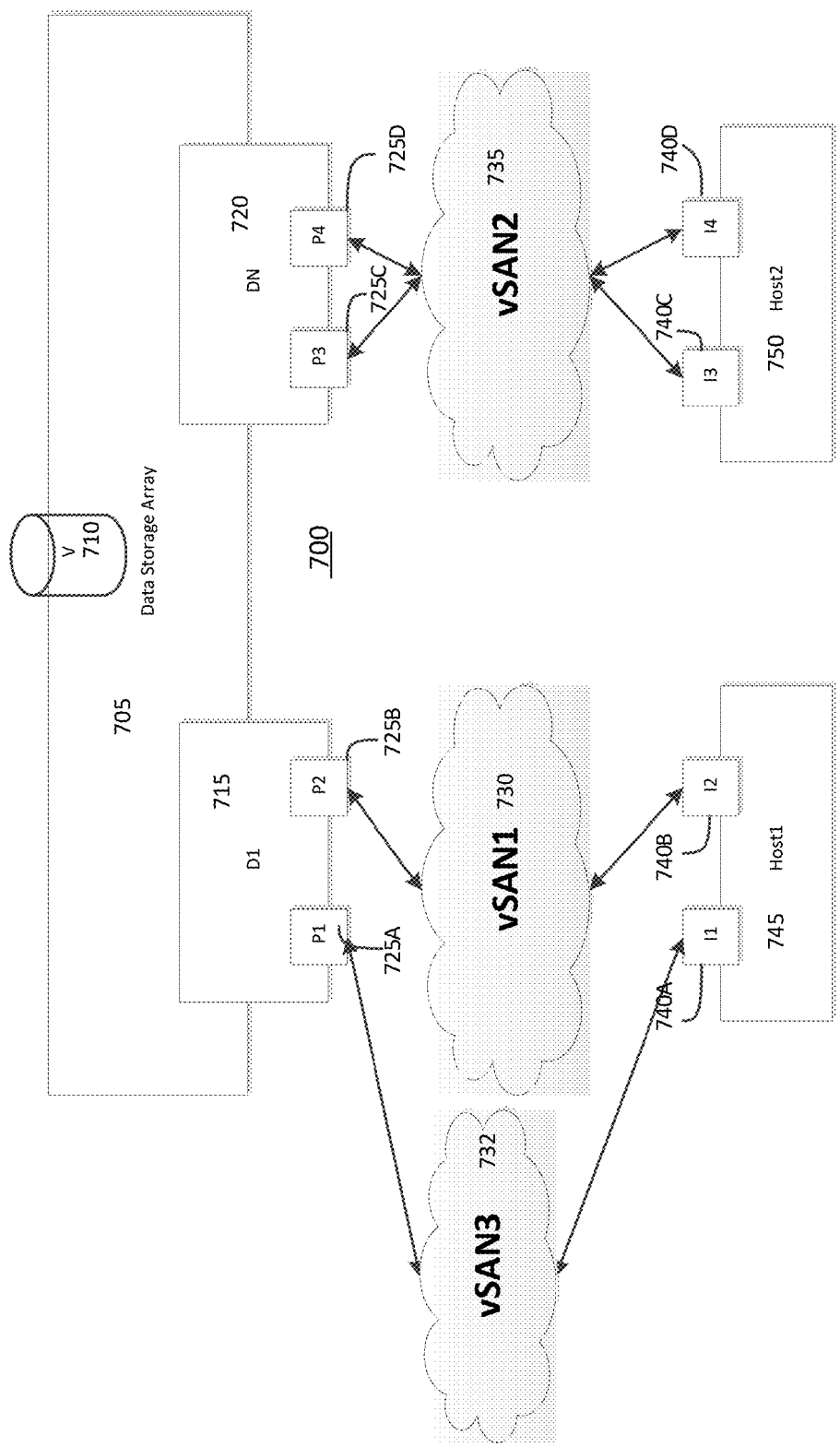
FIG. 7 is a further alternative simplified illustration of a policy based scheduling model, in accordance with an embodiment of the present disclosure.
Figure 8:
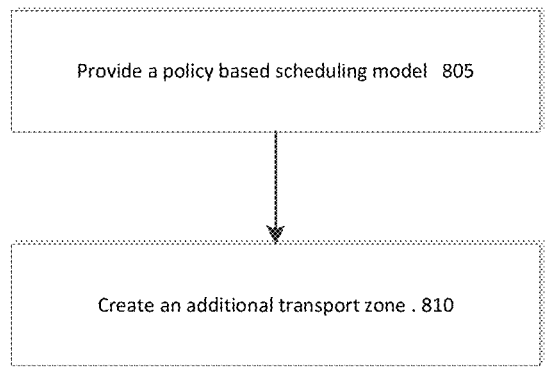
FIG. 8 is an alternative example embodiment of a method of policy based scheduling on a one big array, in accordance with an embodiment of the present disclosure.

Refer now to example embodiments of FIGS. 4, 7 and 8. As shown in FIG. 7, a policy based scheduling model 700 enabled for providing modeled instances of objects representing a heterogeneous storage resource (Step 805). In contrast to FIG. 4, a third transport zone 732 is created, adding an additional transport zone between the storage data resource 705 and the data storage hosts 745, 750. (Step 810). As shown, director port 725A is reserved for use by initiator port 740A.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
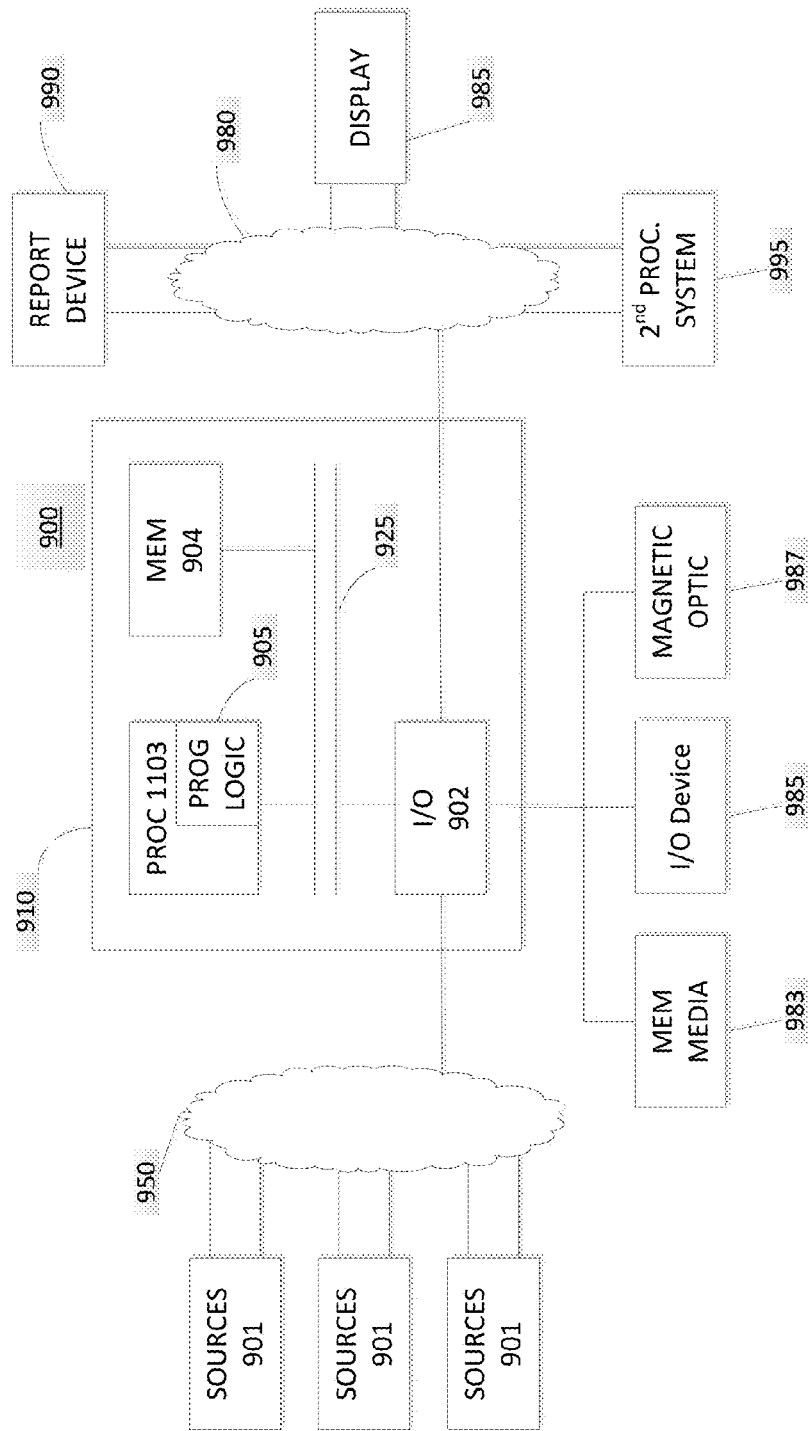
FIG. 9 is an example of an embodiment of an apparatus that may utilize the techniques described herein, in accordance with an embodiment of the present disclosure.

FIG. 9 is a block diagram illustrating an apparatus, such as a computer 910 in a network 900, which may utilize the techniques described herein according to an example embodiment of the present invention. The computer 910 may include one or more I/O ports 902, a processor 903, and memory 904, all of which may be connected by an interconnect 925, such as a bus. Processor 903 may include program logic 905. The I/O port 902 may provide connectivity to memory media 983, I/O devices 985, and drives 987, such as magnetic or optical drives. When the program code is loaded into memory 904 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
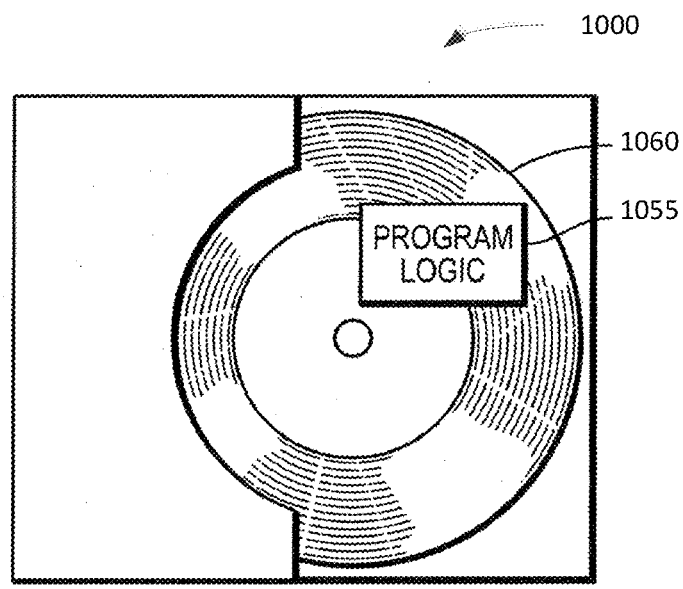
FIG. 10 is an example of a method embodied on a computer readable storage medium that may utilize the techniques described herein, in accordance with an embodiment of the present disclosure.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000. Program Logic 1055 may be the same logic 905 on memory 904 loaded on processor 903 in FIG. 9. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method, comprising:
   querying a heterogeneous storage environment including multiple data storage devices to determine which data services are provided by the heterogeneous storage environment;
   providing a policy based scheduling model comprising modeled instances of objects representing resources and data services provided by the heterogeneous storage environment;
   wherein the resources are provisioned within the heterogeneous storage environment, wherein the heterogeneous storage includes a first type of data storage and a second type of data storage;
   wherein the modeled instances of objects includes a transport zone for mapping a data storage resource within the heterogeneous storage environment to a data storage host;
   wherein each of the modeled instances of objects includes one or more ports to create I/O paths between the data storage resource and the data storage host;
   wherein each of the modeled instances of objects is enabled to use the one or more ports and one or more transport zones to isolate an I/O path between the data storage resource and the data storage host to balance I/O across each of the one or more ports, wherein the isolated I/O path enables the data storage host to have an isolated fault domain; and
   using the policy based scheduling model to manage the provisioning of the data storage resource in the heterogeneous storage environment.

2. The computer-executable method of claim 1, wherein the heterogeneous storage environment further comprises a neighborhood.

3. The computer-executable method of claim 1, wherein using the policy based scheduling model to manage the provisioning of the data storage resource in the heterogeneous storage environment comprises selecting a storage system in which to allocate the data storage resource.

4. The computer-executable method of claim 1, wherein using the policy based scheduling model to manage the provisioning of the data storage resource in the heterogeneous storage environment comprises creating a policy for allocating the data storage resource within the heterogeneous storage environment.

5. The computer-executable method of claim 4, wherein creating a policy using the policy based scheduling model comprises modifying a configuration of the transport zone.

6. The computer-executable method of claim 4, wherein creating a policy for the policy based scheduling model comprises creating an additional transport zone.

7. The computer-executable method of claim 4, wherein creating a policy for the policy based scheduling model comprises modifying a port to direct the I/O path between the data storage resource and the data storage host.

8. The computer-executable method of claim 4, wherein creating a policy for the policy based scheduling model comprises selecting a port to direct the I/O path between the data storage resource and the data storage host.

9. A system, comprising:
   one or more data storage arrays having a data storage resource from heterogeneous storage resources, available for provisioning; and
   computer-executable logic encoded in memory of one or more computers in communication with the available data storage resource, wherein the computer-executable program logic is configured for the execution of:
      querying a heterogeneous storage environment including multiple data storage devices to determine which data services are provided by the heterogeneous storage environment;
      providing a policy based scheduling model comprising modeled instances of objects representing resources and data services provided by the heterogeneous storage environment;
      wherein the resources are provisioned within a heterogeneous storage environment, wherein the heterogeneous storage includes a first type of data storage and a second type of data storage;
      wherein the modeled instances of objects includes a transport zone for mapping a data storage resource within the heterogeneous storage environment to a data storage host;
      wherein each of the modeled instances of objects includes one or more ports to create I/O paths between the data storage resource and the data storage host;
      wherein each of the modeled instances of objects is enabled to use the one or more ports and one or more transport zones to isolate an I/O path between the data storage resource and the data storage host to balance I/O across each of the one or more ports, wherein the isolated I/O path enables the data storage host to have an isolated fault domain; and
      using the policy based scheduling model to manage the provisioning of the data storage resource in the heterogeneous storage environment.

10. The system of claim 9, wherein the heterogeneous storage environment further comprises a neighborhood.

11. The system of claim 9, wherein using the policy based scheduling model to manage the provisioning of the data storage resource in the heterogeneous storage environment comprises selecting a storage system in which to allocate the data storage resource.

12. The system of claim 9, wherein using the policy based scheduling model to manage the provisioning of the data storage resource in the heterogeneous storage environment comprises creating a policy for allocating the data storage resource within the heterogeneous storage environment.

13. The system of claim 12, wherein creating a policy using the policy based scheduling model comprises modifying a configuration of the transport zone.

14. The system of claim 12, wherein creating a policy for the policy based scheduling model comprises creating an additional transport zone.

15. The system of claim 12, wherein creating a policy for the policy based scheduling model comprises modifying a port to direct the I/O path between the data storage resource and the data storage host.

16. The system of claim 12, wherein creating a policy for the policy based scheduling model comprises selecting a port to direct the I/O path between the data storage resource and the data storage host.

17. A computer program product for providing data services, using a single control path, on a data storage resource from heterogeneous storage resources, the computer program product comprising:
   a non-transitory computer readable medium encoded with computer-executable program code for using read signatures in replication, the code configured to enable the execution of:
      querying a heterogeneous storage environment including multiple data storage devices to determine which data services are provided by the heterogeneous storage environment;
      providing a policy based scheduling model comprising modeled instances of objects representing resources and data services provided by the heterogeneous storage environment;
      wherein the resources are provisioned within a heterogeneous storage environment, wherein the heterogeneous storage includes a first type of data storage and a second type of data storage;
      wherein the modeled instances of objects includes a transport zone for mapping a data storage resource within the heterogeneous storage environment to a data storage host;
      wherein each of the modeled instances of objects includes one or more ports to create I/O paths between the data storage resource and the data storage host;
      wherein each of the modeled instances of objects is enabled to use the one or more ports and one or more transport zones to isolate an I/O path between the data storage resource and the data storage host to balance I/O across each of the one or more ports, wherein the isolated I/O path enables the data storage host to have an isolated fault domain; and
      using the policy based scheduling model to manage the provisioning of the data storage resource in the heterogeneous storage environment.

18. The computer program product of claim 17, wherein using the policy based scheduling model to manage the provisioning of the data storage resource in the heterogeneous storage environment comprises selecting a storage system in which to allocate the data storage resource.

19. The computer program product of claim 17, wherein using the policy based scheduling model to manage the provisioning of the data storage resource in the heterogeneous storage environment comprises creating a policy for allocating the data storage resource within the heterogeneous storage environment.

20. The computer program product of claim 19, wherein creating a policy using the policy based scheduling model comprises modifying a configuration of the transport zone.

21. The computer program product of claim 19, wherein creating a policy for the policy based scheduling model comprises creating an additional transport zone.

22. The computer program product of claim 19, wherein creating a policy for the policy based scheduling model comprises modifying a port to direct the I/O path between the data storage resource and the data storage host.

23. The computer program product of claim 19, wherein creating a policy for the policy based scheduling model comprises selecting a port to direct the I/O path between the data storage resource and the data storage host.

* * * * *